(12) United States Patent
Mayuram

(10) Patent No.: US 12,549,541 B2
(45) Date of Patent: Feb. 10, 2026

(54) SECURITY INTERCEPTOR FOR GENERATIVE ARTIFICIAL INTELLIGENCE PLATFORMS

(71) Applicant: MASTERCARD INTERNATIONAL INCORPORATED, Purchase, NY (US)

(72) Inventor: Krishna Mayuram, Morgan Hill, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 22 days.

(21) Appl. No.: 18/756,892

(22) Filed: Jun. 27, 2024

(65) Prior Publication Data

US 2026/0006022 A1 Jan. 1, 2026

(51) Int. Cl.
*H04L 9/40* (2022.01)

(52) U.S. Cl.
CPC ........ *H04L 63/083* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 11,916,767 B1 | 2/2024 | Wu et al. | |
| 11,995,180 B1 | 5/2024 | Cappel et al. | |
| 2007/0180225 A1 | 8/2007 | Schmidt | |
| 2012/0159577 A1* | 6/2012 | Belinkiy | H04L 9/3265 726/4 |

(Continued)

FOREIGN PATENT DOCUMENTS

| | | |
|---|---|---|
| CN | 110795711 A | 2/2020 |
| CN | 107832679 B | 7/2021 |

(Continued)

OTHER PUBLICATIONS

International Search Report and Written Opinion issued in International Application No. PCT/US2025/030294, mailed Sep. 5, 2025, 8 pages.

*Primary Examiner* — Fatoumata Traore
(74) *Attorney, Agent, or Firm* — Talem IP Law, LLP

(57) ABSTRACT

A method of protecting a generative artificial intelligence (AI) platform can include receiving, at a security interceptor, a plurality of communications from the generative AI platform to one or more sources over a network, wherein each communication of the plurality of communications comprises a source-specific safe-for-AI token (SFAI token) associated with a particular source of the one or more sources appended thereto; checking, by the security interceptor, a safety level of each source-specific SFAI token received with the plurality of communications; for each source-specific SFAI token having a safety level indicating a permitted source, permitting a corresponding communication comprising that source-specific SFAI token to be transmitted to the particular source associated therewith; and for any communication of the plurality of communications comprising a corresponding source-specific SFAI token having a safety level indicating a proscribed source, blocking that communication to be transmitted to the particular source associated therewith.

18 Claims, 10 Drawing Sheets

(56) References Cited

U.S. PATENT DOCUMENTS

| | | | |
|---|---|---|---|
| 2014/0189799 A1* | 7/2014 | Lu | H04L 63/102 |
| | | | 726/4 |
| 2020/0336309 A1* | 10/2020 | Wang | G06F 21/31 |
| 2021/0019434 A1* | 1/2021 | Bibliowicz | G06F 21/6218 |
| 2023/0351102 A1 | 11/2023 | Tran | |
| 2024/0202225 A1 | 6/2024 | Siebel et al. | |

FOREIGN PATENT DOCUMENTS

| | | |
|---|---|---|
| CN | 113312674 B | 6/2022 |
| CN | 114070600 B | 9/2023 |
| IN | 202111018415 A | 9/2021 |
| IN | 202311064927 A | 10/2023 |
| KR | 1020240044576 A | 4/2024 |
| WO | 2020019977 A1 | 1/2020 |

\* cited by examiner

SECURITY INTERCEPTOR FOR GENERATIVE ARTIFICIAL INTELLIGENCE PLATFORMS

BACKGROUND

Generative artificial intelligence (AI) is a type of artificial intelligence that uses machine learning models trained on various data to produce new content showing similar characteristics as the data used to train the models. "Large language model" (LLM) refers to a type of generative AI that uses deep learning techniques and very large data sets to understand, summarize, generate, and predict new data (e.g., human language). Transformer LLMs can be capable of unsupervised training (e.g., self-learning). "Small language model" (SLM) refers to an AI system that is a smaller version larger models (e.g., LLMs), but still have the ability to understand, generate, and interpret data.

Generative AI platforms and corresponding tools are quickly gaining in popularity. However, given their need for vast quantities of data for training and their semi-autonomous/autonomous nature, generative AI platforms are susceptible to complications and security concerns that are particular to the requirements and functionalities of generative AI.

For example, generative AI platforms are notorious for generating fictitious information that can be presented as factual or accurate, known as "hallucinations." In some instances, generative AI can even generate completely false answers (e.g., by relying on outdated information) that can also be presented as factual, correct, and/or authoritative. The output quality of a particular generative AI platform is significantly diminished when the generative AI platform ingests bad, untrustworthy, or otherwise non-advantageous data. This can be data that was input by an untrustworthy individual (e.g., included in a prompt), or it could be data that the generative AI platform autonomously pulled.

Indeed, because generative AI platforms make decisions and actions autonomously, it is challenging to adequately protect the generative AI platform from making decisions or taking actions that are ultimately harmful to the generative AI platform.

Therefore, systems and methods for protecting generative AI platforms from ingesting and/or releasing data that can contribute to and exacerbate problems particular to generative AI platforms are needed.

BRIEF SUMMARY

Systems and techniques for protecting the ingress and egress of a generative artificial intelligence (AI) platform are described. For a generative AI platform to be reliable, it must maintain a high standard of quality and integrity. To adequately protect the generative AI platform, the described security interceptor can be used to intercept and validate that every communication at ingress and egress of the generative (AI) platform is safe for the generative AI platform (e.g., by requiring every message at ingress and egress to have a valid safe-for-AI token).

A method of protecting a generative artificial intelligence (AI) platform can include receiving, at a security interceptor, a plurality of communications from the generative AI platform to one or more sources over a network, wherein each communication of the plurality of communications comprises a source-specific safe-for-AI token (SFAI token) associated with a particular source of the one or more sources appended thereto; checking, by the security interceptor, a safety level of each source-specific SFAI token received with the plurality of communications; for each source-specific SFAI token having a safety level indicating a permitted source, permitting a corresponding communication comprising that source-specific SFAI token to be transmitted to the particular source associated therewith; and for any communication of the plurality of communications comprising a corresponding source-specific SFAI token having a safety level indicating a proscribed source, blocking that communication to be transmitted to the particular source associated therewith This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and techniques for protecting the ingress and egress of a generative artificial intelligence (AI) platform are described. For a generative AI platform to be reliable, it must maintain a high standard of quality and integrity. To adequately protect the generative AI platform, the described security interceptor can be used to intercept and validate that every communication at ingress and egress of the generative (AI) platform is safe for the generative AI platform (e.g., by requiring every message at ingress and egress to have a valid safe-for-AI token).

As explained above, because generative AI platforms make decisions and actions autonomously, it is challenging to adequately protect the generative AI platform from making decisions or taking actions that are ultimately harmful to the generative AI platform.

Many conventional security systems and methods focus on authentication and authorization.

Authentication is a process of verifying who a user is. Authentication challenges a user to validate credentials. For example, two-factor authentication requires authentication using two separate factors before a user is granted access to a system (e.g., username/password authorization and one-time-password (OTP) authorization). Authentication can be transmitted through an "ID token" or "identity certificate."

Authorization is a process of verifying what a user has access to through policies and rules. For example, Access Control Lists (ACLs) determine which users or services can access a particular digital environment. This can be accomplished by allowing or denying rules based on a user's authorization level (e.g., general users, super users, administrators, etc.). Authorization validation can be transmitted through an "access token."

While authentication and authorization are vital components in protecting systems and information, in the context of generative AI, they fail to address the particular protection requirements unique to the capabilities and functionality of generative AI platforms.

Figure 1:
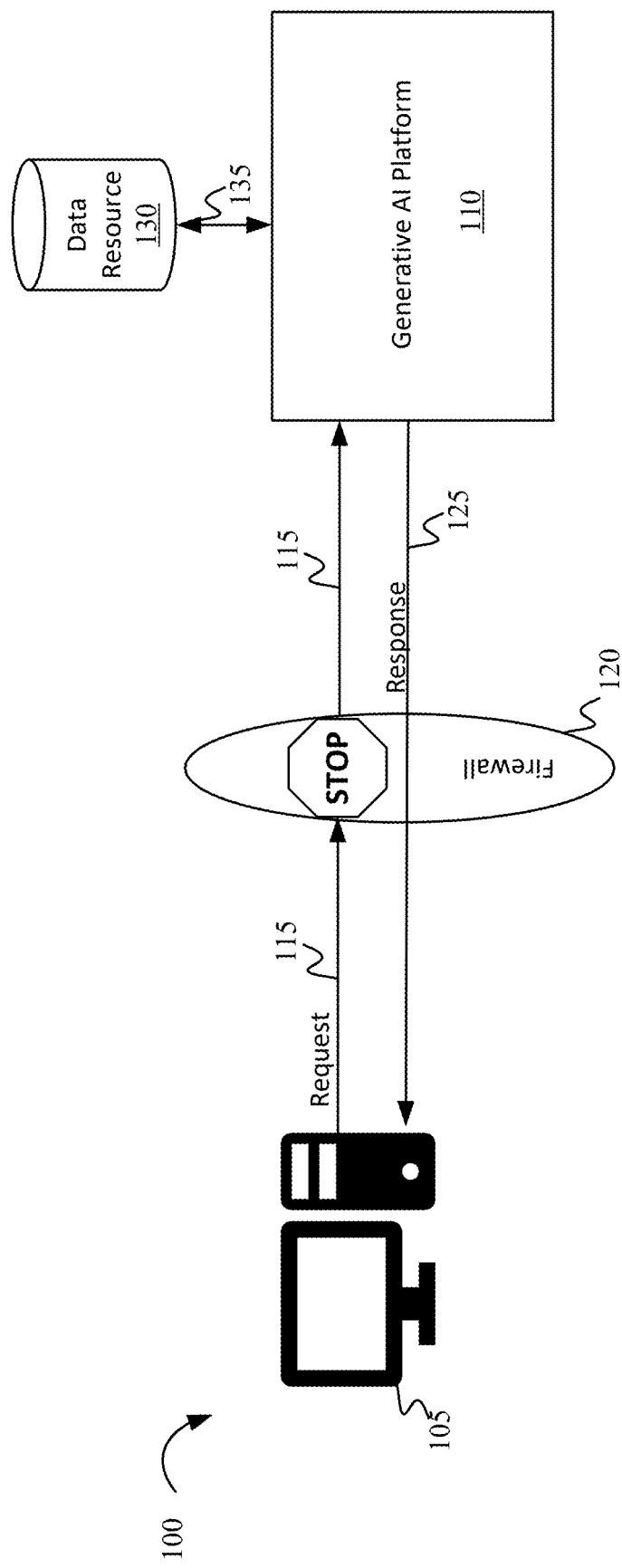
FIG. 1 illustrates a scenario of protecting a generative AI platform using conventional firewall systems and methods.

For example, consider FIG. 1, which illustrates a scenario of protecting a generative AI platform using conventional firewall systems and methods. Referring to FIG. 1, the environment 100 can include a user device 105, a firewall 120, and a generative AI ("gen-AI") platform 110.

In many cases, the firewall 120 can be used to protect inbound and outbound traffic (e.g., north-south traffic, Internet traffic, etc.). The firewall 120 can monitor and control the incoming traffic to filter traffic from insecure or suspect sources. This can protect the security of the gen-AI platform 110 by preventing outside malicious actors or unauthorized users from accessing the gen-AI platform 110.

As shown in FIG. 1, the user device 105 can send a request 115 to the gen-AI platform 110. The firewall 120 intercepts the request 115 and checks the request 115 to ensure that the request has valid authentication (e.g., does the request include an ID token or identity certificate) and/or authorization (e.g., does the request include an access token). Once the firewall 120 confirms that the user device 105 that sent the request 115 has a valid ID token and a valid access token, the firewall 120 can send the request 115 to the gen-AI platform 110.

Assume that the request 115 is requesting that the gen-AI platform 110 generate a summary of a team meeting that was recorded on a third-party application earlier that week. The video file for the team meeting is stored on data resource 130. In order to generate the summary, the gen-AI platform 110 sends a call 135 the video file from data resource 130. Once the gen-AI platform 110 generates the summary, the gen-AI platform 110 can send a response 125 with the summary back to the user device 105.

Notably, while the user device 105 was authorized and authenticated by the firewall 120 when the request 115 was sent, there was no check or assurance that the user device 105 was trustworthy at the time the response 125 was sent back to the user from the gen-AI platform 110. Additionally, there was nothing to protect the gen-AI platform 110 when the call 135 was made for the video file from the data resource 130. In this scenario, the gen-AI platform 110 could have inadvertently introduced "bad," unreliable, or sensitive/confidential information into the gen-AI platform 110 from the data resource 130, as no measures were in place to stop the gen-AI platform 110 from doing so.

While these conventional systems and methods are integral components of cybersecurity and often succeed in preventing bad actors from gaining unauthorized access to secure systems, they do nothing to address the problems that are specific to hosting a generative AI platform. Indeed, preventing data breaches or malicious actors does not prevent hallucinations, false or unreliable information, or stop the generative AI platform from autonomously making unwanted and/or insecure decisions.

The industrialization of AI requires an unprecedentedly high comfort level for all communications entering and leaving the generative AI platform. Indeed, hosting a generative AI platform on a network having multiple assets/integrations in communication with the generative AI platform, like a virtual private cloud (VPC), can inadvertently give rise to a host of different security concerns, none of which are solved by traditional authentication and/or authorization of a user/user device.

The challenges particular to generative AI can pose several security risks, both for the integrity of the generative AI platform and for an organization that owns it (or otherwise has confidential or secure data accessible to the generative AI platform). For example, there are security risks associated with having the generative AI platform act autonomously. Generative AI platforms are capable of autonomously making requests or calls for information from external and/or internal sources (e.g., call 135 described with respect to FIG. 1). Any time a generative AI platform ingests non-sanitized data or information it increases the chances that insecure, risky, illegal, secure, or otherwise unbeneficial information may be introduced to the generative AI platform.

Indeed, there are risks that the generative AI platform may use, and consequently learn from, any data that enters the generative AI platform, including the non-sanitized data that the generative AI platform has requested. For example, if the generative AI platform has access to the Internet, and is autonomously generating a response to prompt, the generative AI platform could bring in "bad" data (e.g., false data, opinion, etc.) that would now become part of the generative AI platform's database. Even if this information is clearly inaccurate (e.g., conspiracy theories, outdated facts, etc.) because there is an immensely large volume of data stored at the generative AI platform, it will almost certainly go unnoticed.

Indeed, "bad" or insecure data can breach the walls of the generative AI platform with ease, despite current security controls and standard authentication methods, which are particularly aimed at preventing attacks by evaluating incoming traffic to filter traffic from insecure or suspect sources (e.g., to prevent outside malicious actors from accessing internal data).

Additionally, the generative AI can make requests or calls that include personal, sensitive, or confidential information (e.g., a search request including aspects of an organizational trade secret), inadvertently sharing or exposing that information.

There are also security risks associated with allowing certain sources (e.g., user devices) access to the generative AI platform. Indeed, someone with proper authorization and authentication may have access to the generative AI platform, and even if actions are taken that pose risks to the generative AI platform (e.g., input prompt with bad information, request illegal activity (e.g., generate using copyrighted material, etc.) that user is still going to have access to the generative AI platform, so long as they still have their authentication and authorization credentials. The user's actions may not be sufficient to alter their authentication or authorization, as they still may be an employee or an administrator, but it would still be beneficial to immediately prevent them from interacting with the generative AI platform.

Advantageously, the described security interceptor monitors the ingress and egress of a generative AI platform for a valid status of a Safe for Artificial Intelligence ("SFAI") token to address the concerns particular to generative AI.

Figure 2:
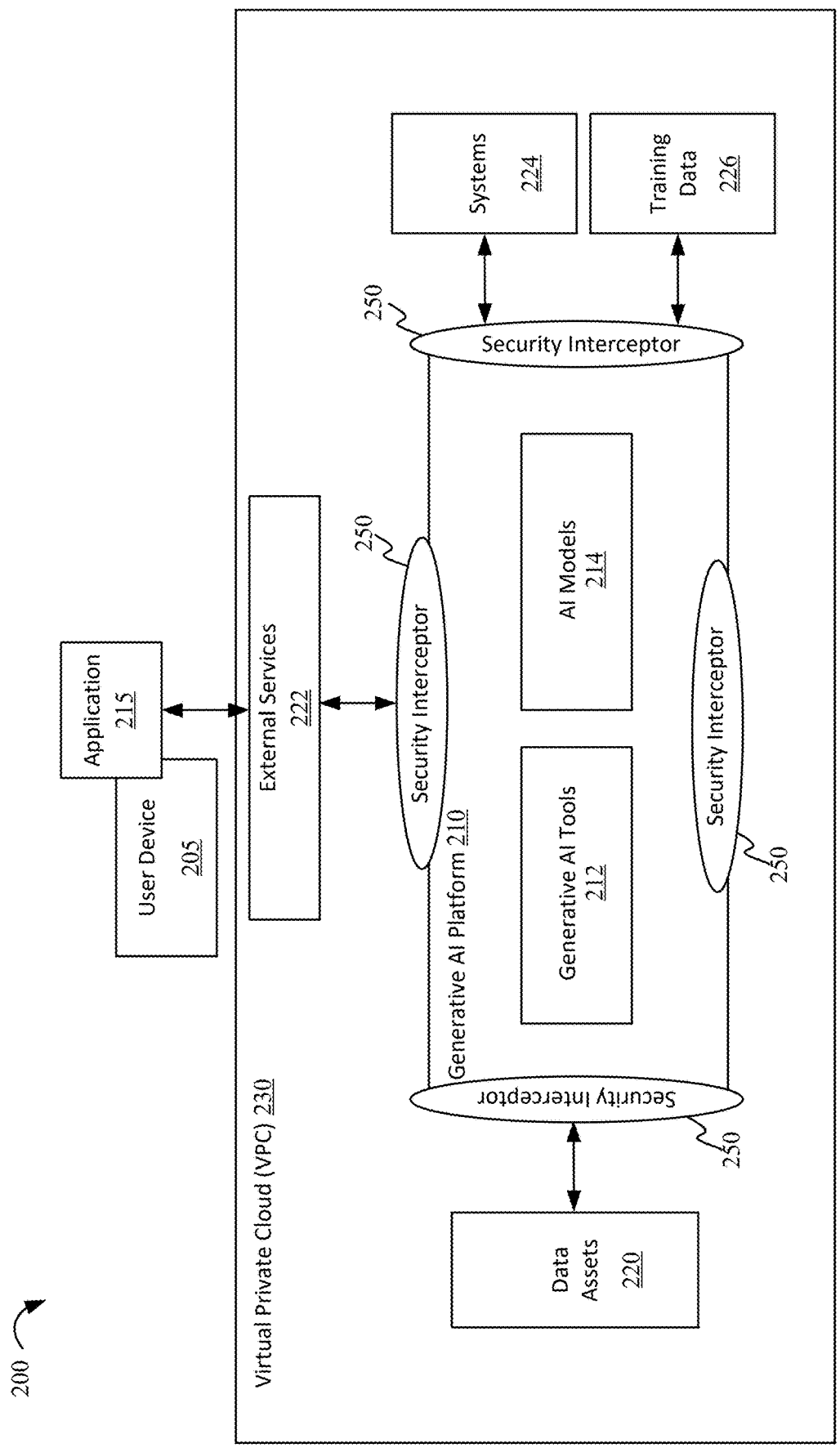
FIG. 2 illustrates an operating environment for a generative AI platform protected by a security interceptor.

FIG. 2 illustrates an operating environment for a generative AI platform protected by a security interceptor. Referring to FIG. 2, the operating environment 200 can include generative AI platform (gen-AI platform) 210, data assets 220, external services 222, systems 224, training data 226, and a security interceptor 250.

In some cases, the operating environment 200 can include a virtual private cloud (VPC) 230. The gen-AI platform 210 can be hosted within the VPC 230. In some cases, the VPC 230 is a microsegmented network in a data center/cloud environment providing isolated workloads and the gen-AI platform 210 is on a micro-segment with appropriate security policies.

The gen-AI platform 210 can include generative AI tools 212 and AI models 214. The AI models 214 can include LLMs and/or SLMs. In some cases, the AI models 214 are hosted by and are run entirely by the VPC 230. In some cases, the AI models 214 are off-platform models (e.g., commercial models) that can be accessed via connections to external endpoints via configured paths and API keys. In some cases, the gen-AI platform 210 has access to cloud object storage or equivalent storage device for storing and managing objects (e.g., model weights and fine-tuning datasets).

The gen-AI platform 210 can communicate with various entities, such as data assets 220, external services 222, systems 224, and training data 226. In some cases, data assets 220 can include files, databases, and third party-applications (e.g., productivity applications, web-based collaborative platforms, software management applications, cloud object storage, etc.). In some cases, external services 222 can include services provided by the owner of the VPC that utilize the capabilities of the gen-AI platform 210 (e.g., chat service, text-to-code service, etc.). In some cases, systems 224 can include decision systems, databases, and search functionality. In some cases, training data can include prompt < > response, few shot examples, etc.

In some cases, the operating environment 200 can also include a user device 205 that can run application 215. The application 215 can provide connectivity to the VPC 230. In some cases, the application 215 can provide connectivity to the gen-AI platform 210. In some cases, the application 215 provides the connectivity to external services 222 that can be supported by the gen-AI platform 210 and hosted on the VPC 230. For example, a user may access the external service 222 (e.g., chat service, text-to-code service, etc.), via the application 215 running on the user device 205. In some cases, application 215 can be or be a part of a productivity application (e.g., word processing, calendar, presentation, search, etc.) and/or content-creation application (e.g., graphic/illustration design, software development, etc.) or even fintech application.

The gen-AI platform 210 can be in constant communication with a plurality of entities (e.g., data assets 220, external services 222, systems 224, training data 226, application 215, etc.). Given the autonomous/semi-autonomous nature of the gen-AI platform 210, it can be difficult, and nearly impossible, to constantly monitor all of the data and information that enters and exits the gen-AI platform 210.

Advantageously, the security interceptor 250 intercepts every message at both the ingress and egress of the gen-AI platform 210 and checks for a valid safe-for-AI (SFAI) token. An example method carried out by the security interceptor 250 is described with respect to FIGS. 3A and 3B. The security interceptor 250 will not permit messages that do not have an appropriate safety level associated with the SFAI token from entering the gen-AI platform 210 and will not permit messages that do not have an appropriate safety level associated with the SFAI token from exiting the gen-AI platform 210.

An SFAI token is a token that is appended to every message that enters or exits the gen-AI platform 210. The SFAI token is associated with an entity in communication with the gen-AI platform 210. For example, communications between the gen-AI platform 210 and the user device 205 will include an SFAI token associated with the user (and/or user device and/or application on the user device). The SFAI token indicates whether the entity associated with the SFAI token is "trusted" to access and/or be accessed by the gen-AI platform 210. In particular, the SFAI token has an associated safety level that indicates permitted and proscribed sources. In some cases, the safety levels include values or indicators of trusted/untrusted, valid/invalid, green/red, or some other manner of conveying trustworthiness. In some cases, there may be three levels, for example, green indicating trustworthiness, yellow indicating questionable, and red indicating untrustworthiness. In some of such cases, only the green safety level permits communications to and from the gen-AI platform 210. The security interceptor 250 can store a mapping on what safety level indicator is considered trustworthy for a particular generative AI platform 210. The trust threshold, and available safety levels may be dynamically configurable by an administrator of the security interceptor 250. The thresholds and changes to levels applied to a trust token can be based on activities detected on various systems, including network behavior and content rules.

In some cases, a SFAI Certificate Authority (CA) is responsible for determining and updating the trust status of the SFAI tokens. In some cases, the SFAI CA is on the VPC 230. In some cases, the security interceptor 250 includes the SFAI CA. In some cases, the SFAI CA is an external service provider. The validity of the SFAI token can be determined based on customizable, dynamic AI controls and security levels, which can be managed at the SFAI CA, for example, by an administrator.

In some cases, the security interceptor 250 can, in addition to checking SFAI token, check whether the message has valid authorization (e.g., a valid identity certificate) and/or valid authentication (e.g., a valid access token).

The security interceptor 250 can be part of a firewall and/or a standalone computing system that includes software/program instructions for performing processes as described herein.

In some cases, the security interceptor 250 is a stateful host-based firewall that prevents ingress and egress of messages with an invalid SFAI token based on a centralized controller (not shown) for the micro-segmented VPC 230. In some cases, security interceptor 250 may be embodied as a computing system such as described with respect to FIG. 7.

Advantageously, the security interceptor 250 protects both the ingress and the egress of the gen-AI platform 210 by requiring a valid SFAI token on every communication that enters and exits the gen-AI platform 210.

Figure 3A:
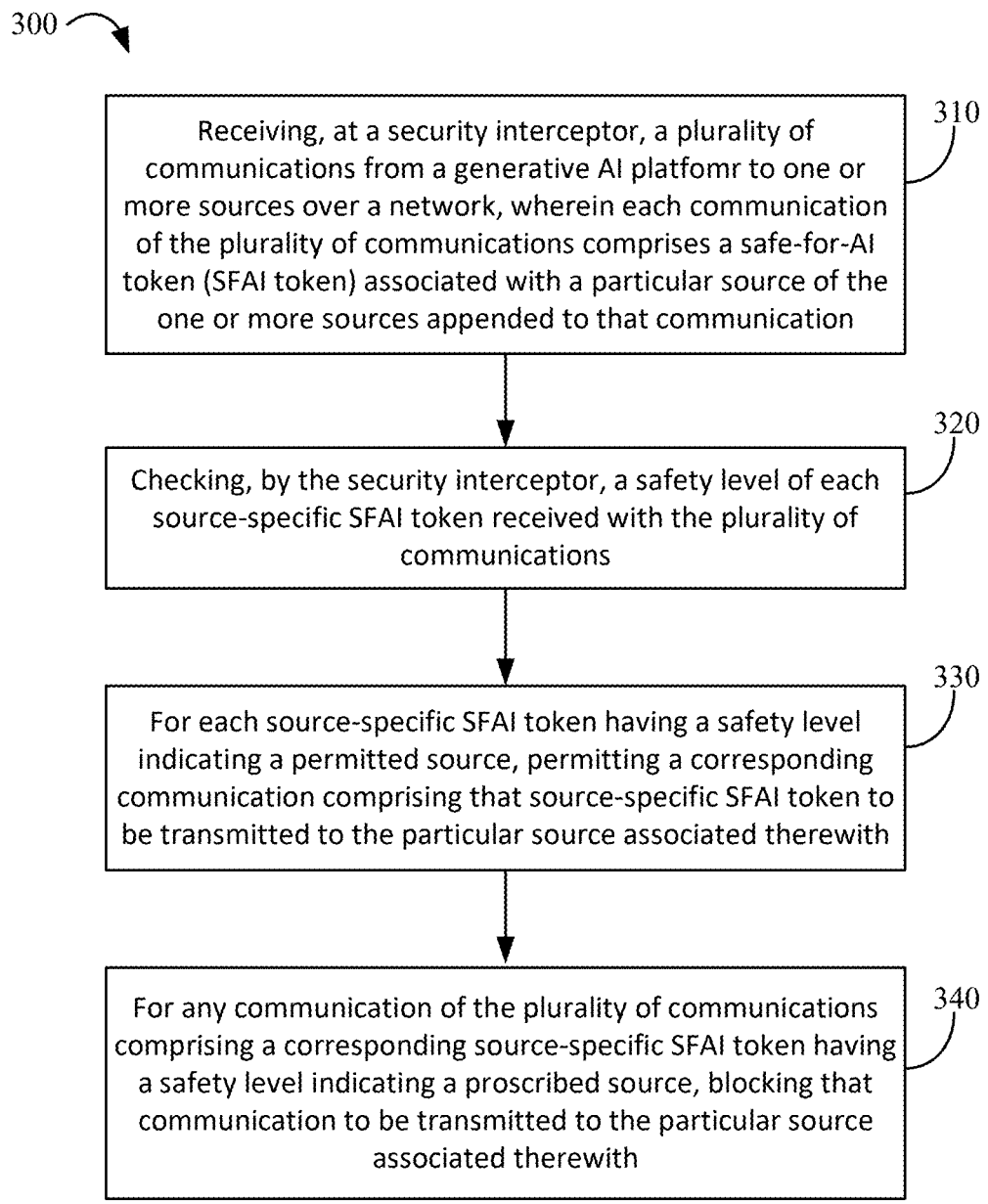
FIG. 3A illustrates a method of protecting a generative AI platform that can be carried out by a security interceptor.
Figure 4:
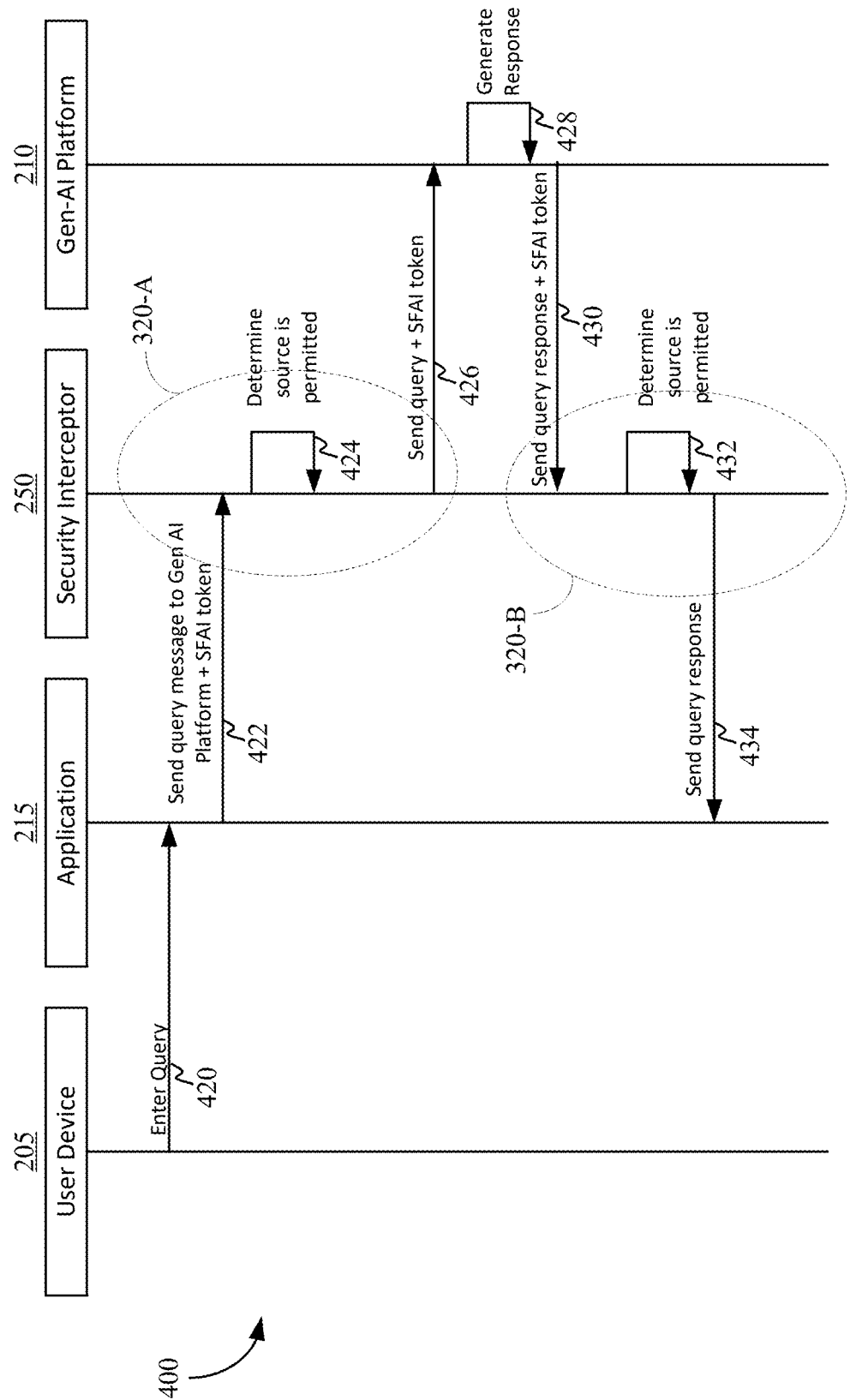
FIG. 4 illustrates a scenario in which ingress to and egress from a generative AI platform is permitted.
Figure 5A:
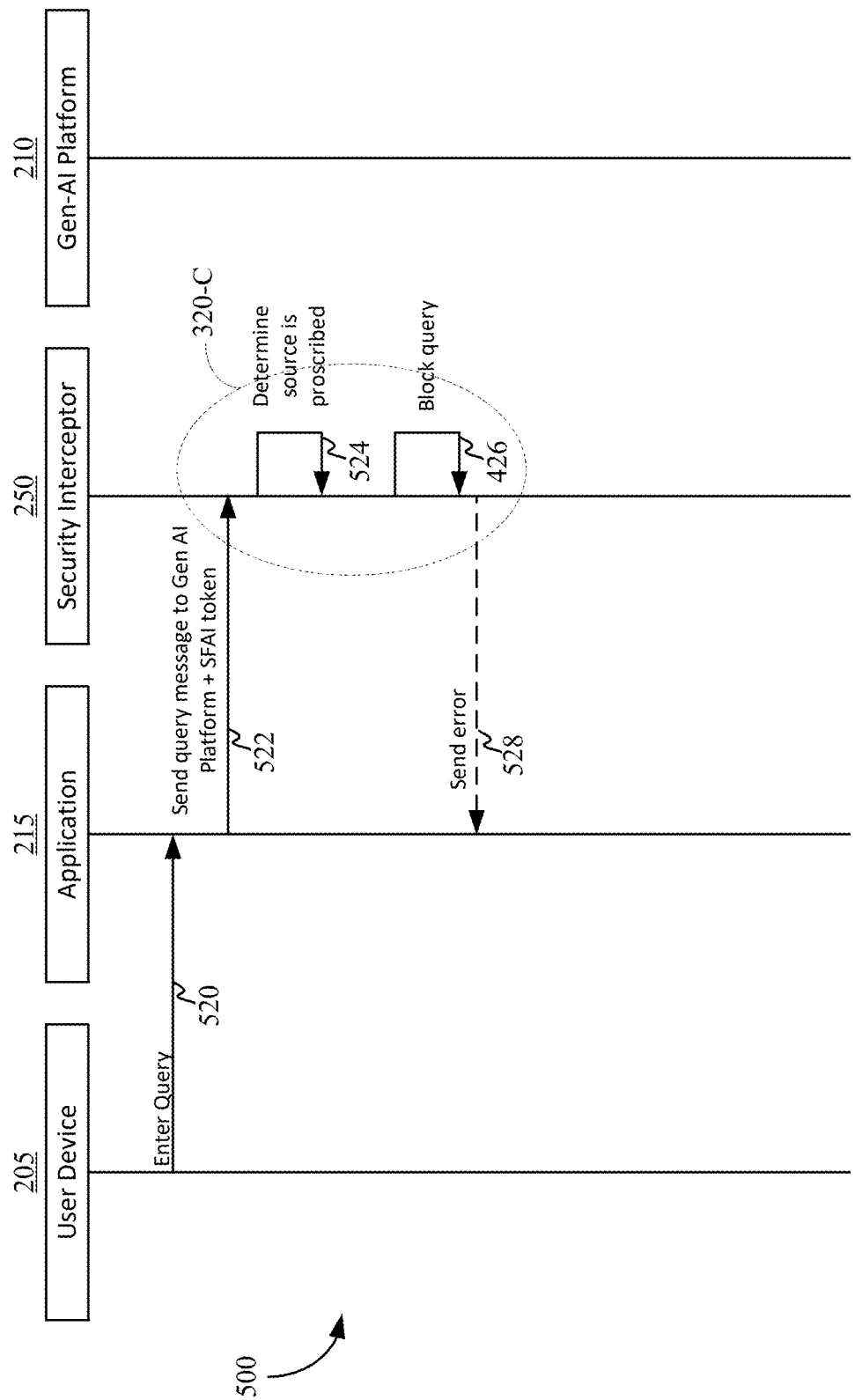
FIG. 5A illustrates a scenario in which ingress to a generative AI platform is blocked.
Figure 5B:
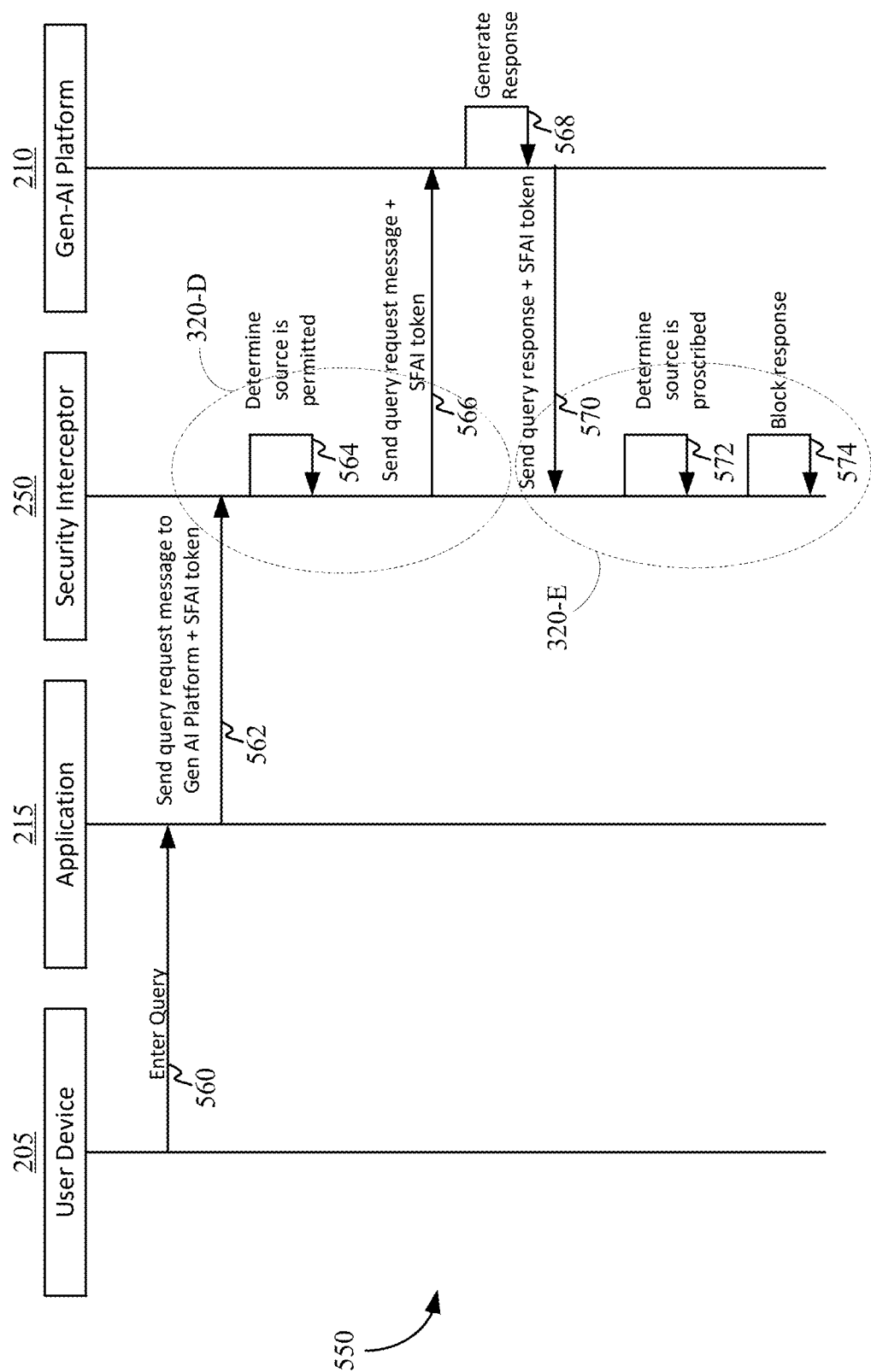
FIG. 5B illustrates a scenario in which egress from a generative AI platform is blocked.
Figure 6A:
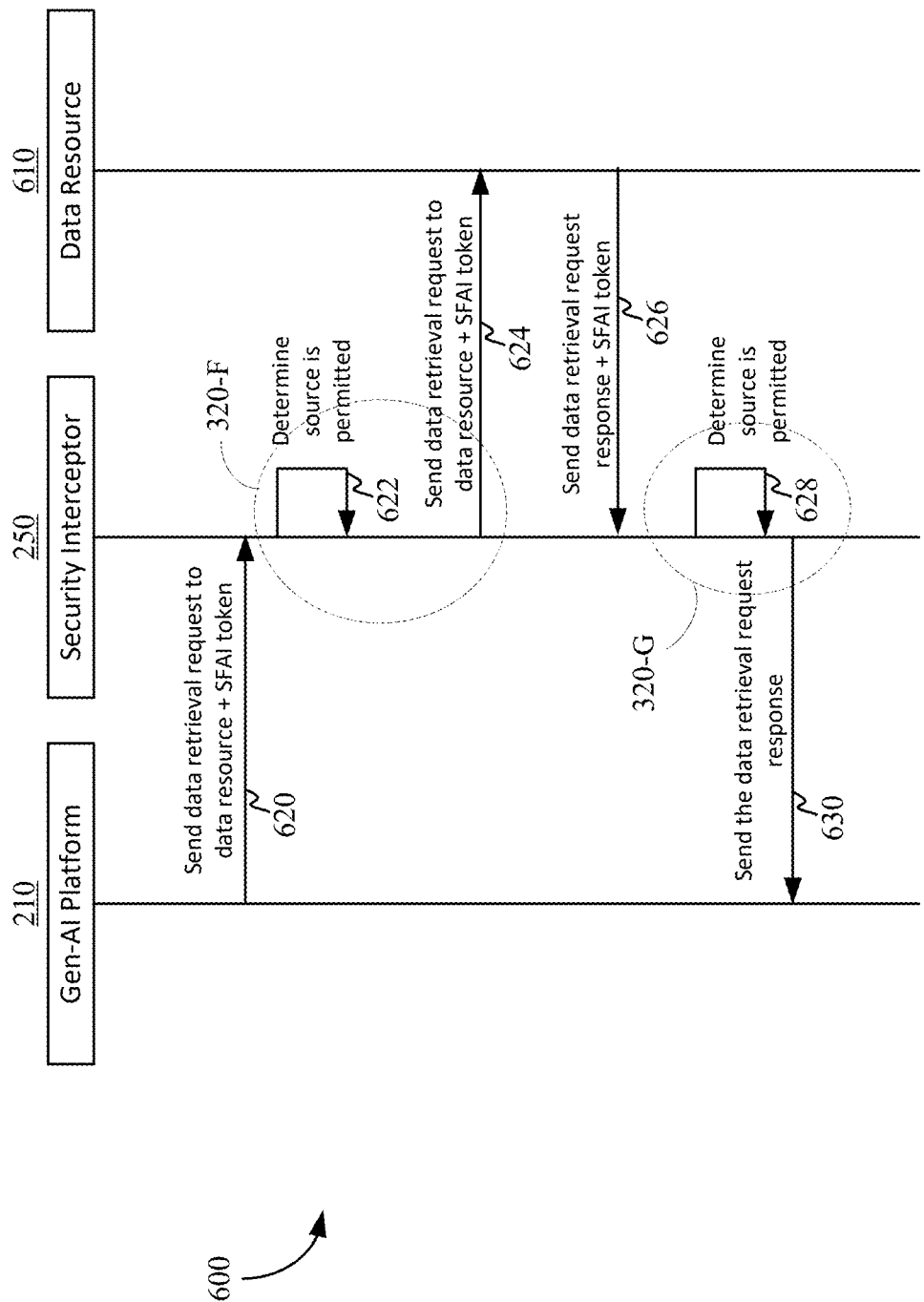
FIGS. 6A and 6B illustrate scenarios of generative AI platform-initiated communications.
Figure 6B:
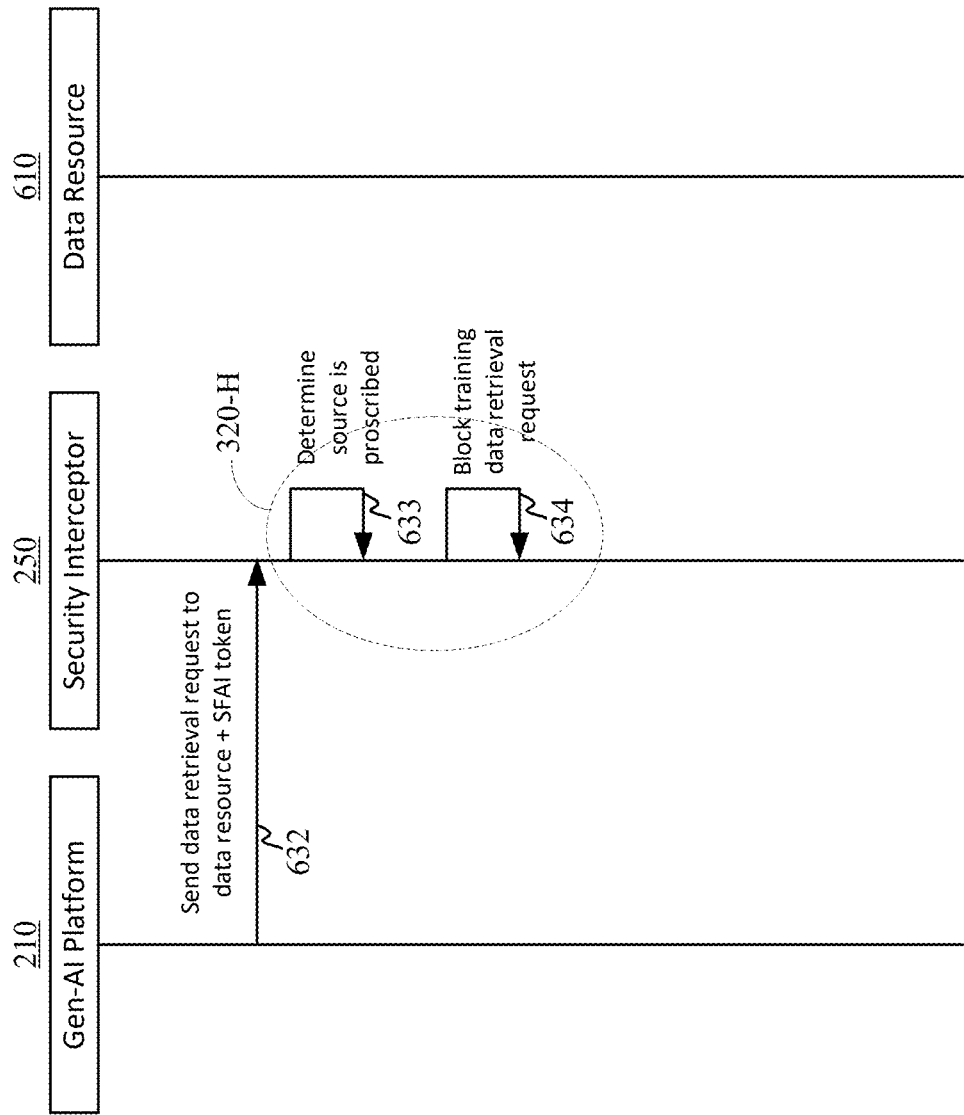

FIG. 3A illustrates a method of protecting a generative AI platform that can be carried out by a security interceptor. Referring to FIG. 3A, a method (300) of protecting a generative AI platform can include receiving (310), at a security interceptor, a plurality of communications from the generative AI platform to one or more sources over a network, wherein each communication of the plurality of communications comprises a source-specific safe-for-AI token (SFAI token) associated with a particular source of the one or more sources appended thereto; checking (320), by the security interceptor, a safety level of each source-specific SFAI token received with the plurality of communications; for each source-specific SFAI token having a safety level indicating a permitted source, permitting (330) a corresponding communication comprising that source-specific SFAI token to be transmitted to the particular source associated therewith; and for any communication of the plurality of communications comprising a corresponding source-specific SFAI token having a safety level indicating an proscribed source, preventing (340) that communication to be transmitted to the particular source associated therewith. FIGS. 4 and 6A illustrate example cases where the communications to and from the generative AI platform are both found to have a safety level indicating a permitted source such that the communications are permitted (330). FIGS. 5A, 5B, and 6B illustrate example cases where the security interceptor determines that a safety level indicates a proscribed source and blocks (340) transmission of the communication.

Figure 3B:
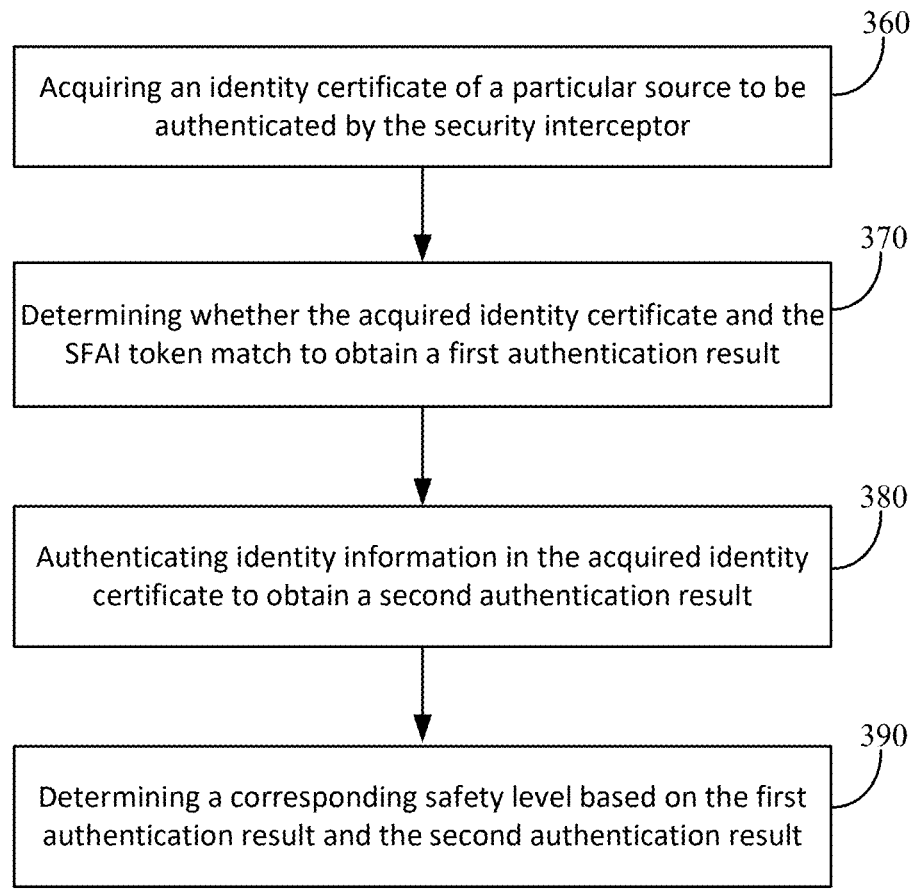
FIG. 3B illustrates an example method for checking a safety level of a SFAI when protecting a generative AI platform.

FIG. 3B illustrates an example method for checking a safety level of a SFAI when protecting a generative AI platform. Referring to FIG. 3B, operation 320 of method 300 may be carried out according to method 350, which includes: acquiring (360) an identity certificate of the particular source to be authenticated by the security interceptor; determining (370) whether the acquired identity certificate and the SFAI token match to obtain a first authentication result; authenticating (380) identity information in the acquired identity certificate to obtain a second authentication result; and determining (390) a corresponding safety level based on the first authentication result and the second authentication result, wherein the corresponding safety level is set using prescribed policies and parameters.

FIG. 4 illustrates a scenario in which ingress to and egress from a generative AI platform is permitted. Referring to FIG. 4, a security interceptor 250 performing method 300 described with respect to FIG. 3A controls ingress to and egress from gen-AI platform 210, for example, with respect to communications to and from a user device 205 executing application 215. The scenario 400 begins when a user, via a user device 205 enters (420) a query at an application 215 running on the user device 205. The "query" may be a prompt of any suitable format. The application 215 is connected to the gen-AI platform 210. For example, application 215 may be chat service application or text-to-code application or other application taking natural language input that utilizes the capabilities of the gen-AI platform 210 (e.g., via external service 222 as illustrated in FIG. 2). The application 215 can send (422) a query message to the gen-AI platform 210. The query message includes an SFAI token. The SFAI token is associated with user device 205 (and/or the application 215). In some cases, the SFAI token may be associated with the user. In some cases, a SFAI CA (not shown) appends the SFAI token to the query message.

The security interceptor 250 receives the message to the gen-AI platform 210 including the SFAI token of the source (e.g., user device 205 and/or application 215). In this case, the security interceptor 250, when checking the safety level of the source-specific SFAI token of this particular received communication (320-A), determines (424) that the source associated with the SFAI token is permitted. In response to determining (424) that the source associated with the SFAI token is permitted, the security interceptor 250 sends (426) the query to the gen-AI platform 210. Checking the safety level of the SFAI token at ingress ensures that, at the time the security interceptor 250 receives the message, the entity (e.g., user device 205) in communication with the gen-AI platform 210 has the required level of trust to interact with the gen-AI platform 210.

In some cases, the query message may also include an authentication token (e.g., identity certificate) and/or an authorization token (e.g., access token). In some cases, the security interceptor 250 can also determine whether the authentication token and/or the authorization token are valid. In some cases, authentication and authorization is performed in a separate, prior step to the query message.

After receiving the query, the gen-AI platform 210 can generate (428) a response to the query. The gen-AI platform 210 can send (430) the generated query response to application 215, but the security interceptor 250 intercepts the query response. The generated query response includes the SFAI token associated with the original source (e.g., the user device 205 and/or application 215). The security interceptor 250 receives the generated query response from the gen-AI platform 210 and checks the SFAI token appended to the communication. In this case, the security interceptor 250, when checking the safety level of the source-specific SFAI token of this particular received communication (320-B), determines (432) that the source associated with the SFAI token is permitted. In response to determining (432) that the source associated with the SFAI token is permitted, the security interceptor 250 sends (434) the generated query response to the application 215. Checking the safety level of the SFAI token at egress ensures that, at the time the security interceptor 250 receives the message, the entity (e.g., user device 205) in communication with the gen-AI platform 210 has the required level of trust to interact with the gen-AI platform 210 and even receive the generated results.

As can be seen, the security interceptor 250 requires both messages from the user device 205 to the gen-AI platform 210 (e.g., query message) and from the gen-AI platform 210 to the user device 205 (e.g., query response) to have a SFAI token indicating a permitted source at the time the communication is sent and/or received by the gen-AI platform 210.

FIG. 5A illustrates a scenario in which ingress to a generative AI platform is blocked. Referring to FIG. 5A, a security interceptor 250 performing method 300 described with respect to FIG. 3A controls ingress to and egress from gen-AI platform 210, for example, with respect to communications to and from a user device 205 executing application 215. The scenario 500 begins similar to that described with respect to FIG. 4 when a user, via a user device 205 enters (520) a query at an application 215 running on the user device 205; and application 215 sends (522) a query message to the gen-AI platform 210, including the query entered by the user at the user device 205. The query message includes a SFAI token, which is associated with user device 205 (and/or the application 215). In some cases, a SFAI CA (not shown) appends the SFAI token to the query message.

The security interceptor 250 receives the query message to the gen-AI platform 210 including the SFAI token of the source (e.g., user device 205 and/or application 215). In this case, the security interceptor 250, when checking the safety level of the source-specific SFAI token of this particular received communication (320-C), determines (524) that the source associated with the SFAI token is proscribed. In response to determining (524) that the source associated with the SFAI token is proscribed, the security interceptor 250 blocks (526) the query from being sent to the gen-AI platform 210.

In some cases, the query message including the query may also include an authentication token (e.g., identity certificate) and/or an authorization token (e.g., access token). The security interceptor 250 can also determine whether the authentication token and/or the authorization token are valid. However, even if the authentication token and/or the authorization token are valid, the security interceptor 250 can still block (526) the query from being sent to the gen-AI platform 210 due to the safety level of the SFAI token indicating that the source is proscribed. In some cases, the security interceptor can send (528) an error message to the application 215 in response to determining (424) that the safety level of the SFAI token indicates that the source is proscribed. In some cases, in response to determining that the SFAI token is proscribed, the security interceptor 250 can invalidate the authentication token and/or authorization token of the user as well, effectively revoking the ability for the user device 205 to access the VPC hosting the gen-AI platform (e.g., VPC 230 as described with respect to FIG. 2).

FIG. 5B illustrates a scenario in which egress from a generative AI platform is blocked. Referring to FIG. 5B, a security interceptor 250 performing method 300 described with respect to FIG. 3A controls ingress to and egress from gen-AI platform 210, for example, with respect to communications to and from a user device 205 executing application 215. The scenario 550 begins similar to that described with respect to FIG. 5A when a user, via a user device 205 enters (560) a query at an application 215 running on the user device 205 and application 215 sends (562) a query message to the gen-AI platform 210, including the query entered by the user at the user device 205. The query message includes a SFAI token, which is associated with user device 205 (and/or the application 215). In some cases, a SFAI CA (not shown) appends the SFAI token to the query message.

The security interceptor 250 receives the query message to the gen-AI platform 210 including the SFAI token of the source (e.g., user device 205 and/or application 215). In this case, the security interceptor 250, when checking the safety level of the source-specific SFAI token of this particular received communication (320-D), determines (564) that the source associated with the SFAI token is permitted. In response to determining (564) that the source associated with the SFAI token is permitted, the security interceptor 250 allows the query message to be sent (566) to the gen-AI platform 210.

In some cases, the query message may also include an authentication token (e.g., identity certificate) and/or an authorization token (e.g., access token). The security interceptor 250 can also determine (directly or via an appropriate service) whether the authentication token and/or the authorization token are valid.

After receiving the query message, the gen-AI platform 210 can generate (568) a response in accordance with the query. The gen-AI platform 210 can send (570) a query response and the SFAI token to application 215. However, the security interceptor 250 receives the query response including the generated code and checks the safety level of the source-specific SFAI token before allowing the query response to continue to the application 215. In this case, when checking (320-E) the safety level of the source-specific SFAI token of this particular received communication from the gen-AI platform 210, the security interceptor 250 determines (572) that the source associated with the SFAI token is proscribed. In response to determining (572) that the source associated with the SFAI token is proscribed, the security interceptor 250 blocks (574) the query response from being sent to the application 215 at the user device 205.

Notably, in this scenario, the safety level of the SFAI token associated with the user device 205 (and/or application 215) changed between the time that the application 215 sent (562) the text-to-code request message to the gen-AI platform 210 and the time that the gen-AI platform 210 attempted to send (570) the response to the application 215. This illustrates how the monitoring of both the ingress to and egress from a gen-AI platform can protect the gen-AI platform (and content generated by that platform). Indeed, the change of the trust status/safety level of the SFAI token associated with the user device 205 indicates that the user device 205 is no longer trusted to a degree that is suitable for communication with the gen-AI platform 210. In this example, if the query was part of a text-to-code request, the code generated by the gen-AI platform 210 for the query response is protected from being distributed to untrusted sources (e.g., user device 205).

In this scenario, the user device 205 may have a valid authentication token and a valid authorization token, but as soon as the status of the SFAI token associated with the user device 205 indicates a proscribed source, the user device 205 is not permitted to access the gen-AI platform 210. Advantageously, the security interceptor 250 protects the gen-AI platform 210 from threats specific to generative AI. For example, assume that the generated code included blocks of code that were trade secrets. By ensuring that the outgoing communication included a valid SFAI token, the security interceptor 250 prevents unintentional disclosure of secure information.

In a similar scenario, where the gen-AI platform 210 was not protected by a security interceptor, there would be nothing preventing the gen-AI platform 210 from sending the response including the generated code to the user device 205 (assuming the text-to-code request message included valid authentication and/or authorization).

FIGS. 6A and 6B illustrate scenarios of generative AI platform-initiated communications. As mentioned above, there are scenarios in which a gen-AI platform receives requests and responds to those requests. In some cases, before responding to a request, the gen-AI platform may transmit a communication (e.g., as a request for content) to another source or component to obtain a response from that source or component. In addition, in some cases, the gen-AI platform may transmit requests for content that can be used as training data. The described security interceptor evaluates the SFAI tokens of these sources/components for the gen-AI platform-initiated communications in addition to external source-initiated requests. In some cases, the source receiving a generative AI platform-initiated communication is a data asset, system, training data, or external service hosted on the same VPC and/or network as the generative AI platform (e.g., data asset 220, system 224, training data 226, and/or external services 222 as described with respect to FIG. 2).

In FIG. 6A, egress from and ingress to the gen-AI platform is shown being permitted. Referring to FIG. 6A, a security interceptor 250 performing method 300 described with respect to FIG. 3A controls egress from and ingress to gen-AI platform 210, for example, with respect to communications to and from a data resource 610 (which may be available as part of any of data asset 220, system 224, training data 226, and/or external services 222 as described with respect to FIG. 2). The scenario 600 begins when the gen-AI platform 210 sends (620) a data retrieval request to a data resource 610. As an illustrative example, the data resource 610 can be a file folder of a document management and storage system of an enterprise. That is, the source can be on a private/enterprise network (or private tenant of a cloud network). In some cases, the document management and storage system is associated with the VPC hosting the gen-AI platform 210 (e.g., VPC 230 as described with respect to FIG. 2).

As part of the data retrieval request, an SFAI token associated with the data resource 610 is included. The SFAI token may be appended to the data request message by the gen-AI platform or a SFAI CA (not shown).

The security interceptor 250 receives the data retrieval request to the data resource 610 including the SFAI token of the resource 610. In this case, the security interceptor 250, when checking the safety level of the source-specific SFAI token of this particular received communication (320-F), determines (622) the source associated with the SFAI token (e.g., the resource 610) is permitted. For example, the resource 610 (e.g., file folder) can be indicated by the safety level to be a trustworthy source of information for the gen-AI platform 210 to access. In response to determining (622) that source associated with the SFAI token is permitted, the security interceptor 250 sends (624) the data retrieval request to data resource 610. Checking the safety level of the SFAI token at egress ensures that, at the time the security interceptor 250 receives the message, the entity (e.g., resource 610) to which the gen-AI platform 210 is attempting communication has the required level of trust to interact with the gen-AI platform 210.

The data resource 610 can send (626) a data retrieval request response. The data retrieval request response includes the SFAI token associated with the data resource 610. The security interceptor receives the data retrieval request response from the data resource 610 and checks the SFAI token appended to the communication. In this case, the security interceptor 250, when checking the safety level of the source-specific SFAI token of this particular received communication (320-G), determines (628) that the source associated with the SFAI token is still permitted. In response to determining that the source associated with the SFAI token is permitted, the security interceptor 250 sends (630) the data retrieval request response to the gen-AI platform 210. Checking the safety level of the SFAI token at ingress ensures that, at the time the security interceptor 250 receives the message, the entity (e.g., data resource 610) in communication with the gen-AI platform 210 has the required level of trust to interact with the gen-AI platform 210.

FIG. 6B illustrates a scenario where egress from the gen-AI platform is blocked. The process illustrated in FIG. 6B may be a continuation of the process illustrated and described with respect to FIG. 6A and is applicable to other sources. Similar to that described with respect to FIG. 5B, the scenario begins when the gen-AI platform 210 sends (632) a data retrieval request to the data resource 610. Unlike the scenario 600 of FIG. 6A, when the security interceptor 250 checks (320-H) the safety level of the SFAI token included as part of the request, the security interceptor 250 determines (633) that the source associated with the SFAI token is proscribed. In response to determining (633) that the source associated with the SFAI token is now proscribed, the security interceptor 250 blocks (634) the data retrieval request.

In this case, the safety level with respect to the data resource 610 changed from permitted (as described with respect to FIG. 6A) to proscribed. Advantageously, because the security interceptor 250 monitors the ingress and egress of the gen-AI platform 210 in real-time, the integrity and security of the gen-AI platform 210 can be constantly maintained.

Figure 7:
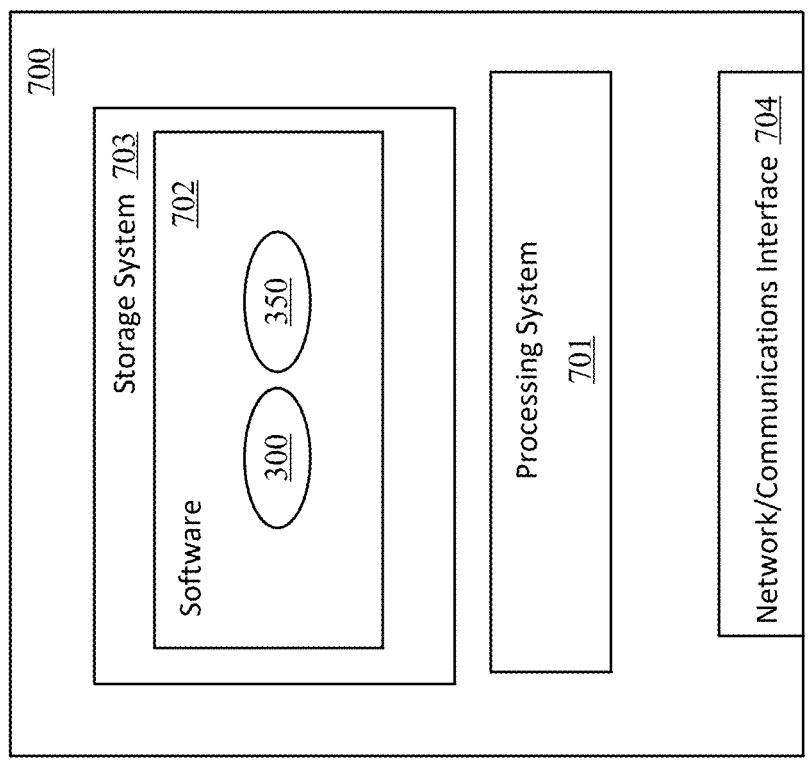
FIG. 7 illustrates components of a computing system that may be used in certain embodiments described herein.

FIG. 7 illustrates components of a computing system that may be used in certain embodiments described herein. Referring to FIG. 7, system 700 may be implemented within a single computing device or distributed across multiple computing devices or sub-systems that cooperate in executing program instructions. In some cases, system 700 can be a firewall hardware device, router, or other computing system on a network. In general, system 700 can include one or more blade server devices, standalone server devices, personal computers, routers, hubs, switches, bridges, firewall devices, intrusion detection devices, mainframe computers, network-attached storage devices, and other types of computing devices.

The system 700 can include a processing system 701, which may include one or more processors and/or other circuitry that retrieves and executes software 702 from storage system 703. Processing system 701 may be implemented within a single processing device but may also be distributed across multiple processing devices or sub-systems that cooperate in executing program instructions.

Storage system(s) 703 can include any computer readable storage media readable by processing system 701 and capable of storing software 702. Storage system 703 may be implemented as a single storage device but may also be implemented across multiple storage devices or sub-systems co-located or distributed relative to each other. Storage system 703 may include additional elements, such as a controller, capable of communicating with processing system 701. Storage system 703 may also include storage devices and/or sub-systems on which data is stored. System 700 may access one or more storage resources in order to access information to carry out any of the processes indicated by software 702.

Software 702, including routines for performing processes, may be implemented in program instructions and among other functions may, when executed by system 700 in general or processing system 701 in particular, direct the system 700 or processing system 701 to operate as described herein. For example, software 702 can include, but is not limited to, instructions for security interceptor 250 and methods 300 and 350.

In embodiments where the system 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 704 may be included, providing communication connections and devices that allow for communication between system 700 and other computing systems (not shown) over a communication network or collection of networks (not shown) (e.g., VPC 230) or the air.

In some embodiments, system 700 may host one or more virtual machines.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of protecting a generative artificial intelligence (AI) platform, comprising:
   receiving, at a security interceptor, a plurality of communications from the generative AI platform to one or more sources over a network, wherein each communication of the plurality of communications comprises a source-specific safe-for-AI token (SFAI token) associated with a particular source of the one or more sources appended thereto;
   checking, by the security interceptor, a safety level of each source-specific SFAI token received with the plurality of communications, wherein checking, by the security interceptor, the safety level of each source-specific SFAI token received with the plurality of communications comprises:
      acquiring an identity certificate of the particular source to be authenticated by the security interceptor;
      determining whether the acquired identity certificate and the SFAI token match to obtain a first authentication result;
      authenticating identity information in the acquired identity certificate to obtain a second authentication result; and
      determining a corresponding safety level based on the first authentication result and the second authentication result, wherein the corresponding safety level is set using prescribed policies and parameters;
   for each source-specific SFAI token having a safety level indicating a permitted source, permitting a corresponding communication comprising that source-specific SFAI token to be transmitted to the particular source associated therewith; and
   for any communication of the plurality of communications comprising a corresponding source-specific SFAI token having a safety level indicating a proscribed source, blocking that communication to be transmitted to the particular source associated therewith.

2. The method of claim 1, further comprising:
   receiving, at the security interceptor, a request message to the generative AI platform from a verified source over the network, wherein the verified source has a valid authentication of identity and a valid authorization of authority for communication over the network, wherein the request message from the verified source comprises a first SFAI token appended to the request message;
   determining, at the security interceptor, that the first SFAI token appended to the request message has the safety level indicating a proscribed source; and
   in response to determining that the first SFAI token appended to the request message has the safety level indicating the proscribed source, blocking the request message from entering the generative AI platform.

3. The method of claim 1, wherein at least one communication of the plurality of communications is a first response message, the method further comprising:
   receiving, at the security interceptor, a first message to the generative AI platform from a first source, wherein the first message from the first source comprises a first SFAI token appended to the first message, wherein the first SFAI token is associated with the first source;
   determining, at the security interceptor, that a safety level of the first SFAI token indicates the first source is permitted;
   in response to determining that the safety level of the first SFAI token appended to the first message indicates the first source is permitted, sending the first message to the generative AI platform;
   wherein checking the safety level of each source-specific SFAI token received with the plurality of communications comprises determining, at the security interceptor, that the safety level of the first SFAI token appended to the first response message indicates the first source is permitted; and
   in response to determining that the safety level of the first SFAI token appended to the first response message is permitted, sending the first response message to the first source.

4. The method of claim 3, further comprising:
   receiving, at the security interceptor, a second message to the generative AI platform from the first source after receiving the first message, wherein the second message from the first source comprises the first SFAI token appended to the second message;
   determining, at the security interceptor, that the safety level of the first SFAI token appended to the second message indicates the first source is proscribed; and
   in response to determining that the first SFAI token appended to the second message is invalid, revoking access of the first source to the generative AI platform and preventing the second message from being transmitted to the generative AI platform.

5. The method of claim 4, wherein the first source is a user device, and wherein the second message further comprises an identity certificate associated with the user device or a user of the user device for verifying identity, and an access token associated with the user device or the user of the user device for verifying authority to access the network or an application associated with the generative AI platform.

6. The method of claim 5, further comprising:
   determining, at the security interceptor, that the identity certificate associated with the user device is valid; and
   determining, at the security interceptor, that the access token associated with the user device is valid.

7. The method of claim 1, wherein at least one communication of the plurality of communications is a second response message, the method further comprising:
   receiving, at the security interceptor, a second message from a second source, wherein the second message from the second source comprises a first SFAI token appended to the second message;

determining, at the security interceptor, that a safety level of the first SFAI token appended to the second message indicates the second source is permitted;

in response to determining that the safety level of the first SFAI token appended to the second message indicates the second source is permitted, sending the second message to the generative AI platform;

wherein checking the safety level of each source-specific SFAI token received with the plurality of communications comprises determining, at the security interceptor, that the safety level of the first SFAI token appended to the second response message indicates the second source is proscribed; and in response to determining that the safety level of the first SFAI token appended to the second response message indicates the second source is proscribed, blocking the second response message from being sent to the second source.

8. The method of claim 1, wherein at least one communication of the plurality of communications is a first request message to a second source, wherein checking, by the security interceptor, the safety level of each source-specific SFAI token comprises determining, at the security interceptor, that a safety level of a second SFAI token associated with the second source indicates the second source is permitted;

the method further comprising:
in response to determining that the safety level of the second SFAI token indicates the second source is permitted, sending the first request message to the second source;

receiving, at the security interceptor, a first response message to the generative AI platform from the second source, wherein the first response message comprises the second SFAI token appended to the first response message;

determining, at the security interceptor, that a safety level of the second SFAI token appended to the first response message indicates the second source is permitted; and in response to determining that the safety level of the second SFAI token appended to the first response message indicates the second source is permitted, sending the first response message to the second source.

9. The method of claim 8, wherein at least one communication of the plurality of communications is a second request message to the second source, wherein checking, by the security interceptor, the safety level of each source-specific SFAI token comprises determining, at the security interceptor, that the safety level of the second SFAI token that is appended to the second request message indicates the second source is proscribed; and in response to determining that the safety level of the second SFAI token indicates the second source is proscribed, blocking the second request message from exiting the generative AI platform.

10. A computer readable storage medium having instructions stored thereon that when executed by a computing system embodying a security interceptor, direct the security interceptor to at least:

receive, at the security interceptor, a plurality of communications from a generative artificial intelligence (AI) platform to one or more sources over a network, wherein each communication of the plurality of communications comprises a source-specific safe-for-AI token (SFAI token) associated with a particular source of the one or more sources appended thereto;

check, by the security interceptor, a safety level of each source-specific SFAI token received with the plurality of communications, wherein the instructions directing the security interceptor to check the safety level of each source-specific SFAI token received with the plurality of communications direct the security interceptor to at least:

acquire an identity certificate of the particular source to be authenticated by the security interceptor;

determine whether the acquired identity certificate and the SFAI token match to obtain a first authentication result;

authenticate identity information in the acquired identity certificate to obtain a second authentication result; and determine a corresponding safety level based on the first authentication result and the second authentication result, wherein the corresponding safety level is set using prescribed policies and parameters;

for each source-specific SFAI token having a safety level indicating a permitted source, permit a corresponding communication comprising that source-specific SFAI token to be transmitted to the particular source associated therewith; and for any communication of the plurality of communications comprising a corresponding source-specific SFAI token having a safety level indicating a proscribed source, block that communication to be transmitted to the particular source associated therewith.

11. The computer readable storage medium of claim 10, wherein the instructions further direct the security interceptor to at least:

receive, at the security interceptor, a request message to the generative AI platform from a verified source over the network, wherein the verified source has a valid authentication of identity and a valid authorization of authority for communication over the network, wherein the request message from the verified source comprises a first SFAI token appended to the request message;

determine, at the security interceptor, that the first SFAI token appended to the request message has the safety level indicating a proscribed source; and in response to the first SFAI token appended to the request message having the safety level indicating the proscribed source, block the request message from entering the generative AI platform.

12. The computer readable storage medium of claim 10, wherein at least one communication of the plurality of communications is a first response message, the instructions further directing the security interceptor to at least:

receive, at the security interceptor, a first message to the generative AI platform from a first source, wherein the first message from the first source comprises a first SFAI token appended to the first message, wherein the first SFAI token is associated with the first source;

determine, at the security interceptor, that a safety level of the first SFAI token indicates the first source is permitted;

in response to the safety level of the first SFAI token appended to the first message indicating the first source is permitted, send the first message to the generative AI platform;

wherein instructions to check the safety level of each source-specific SFAI token received with the plurality of communications direct the security interceptor to at least determine, at the security interceptor, that the safety level of the first SFAI token appended to the first response message indicates the first source is permitted; and in response to the safety level of the first SFAI token appended to the first response message being permitted, send the first response message to the first source.

13. The computer readable storage medium of claim 12, wherein the instructions further direct the security interceptor to at least:

receive, at the security interceptor, a second message to the generative AI platform from the first source after receiving the first message, wherein the second message from the first source comprises the first SFAI token appended to the second message;

determine, at the security interceptor, that the safety level of the first SFAI token appended to the second message indicates the first source is proscribed; and in response to the first SFAI token appended to the second message being invalid, revoke access of the first source to the generative AI platform and prevent the second message from being transmitted to the generative AI platform.

14. The computer readable storage medium of claim 13, wherein the first source is a user device, and wherein the second message further comprises an identity certificate associated with the user device or a user of the user device for verifying identity, and an access token associated with the user device or the user of the user device for verifying authority to access the network or an application associated with the generative AI platform.

15. The computer readable storage medium of claim 14, further comprising instructions that direct the security interceptor to at least:

determine, at the security interceptor, that the identity certificate associated with the user device is valid; and determine, at the security interceptor, that the access token associated with the user device is valid.

16. The computer readable storage medium of claim 10, wherein at least one communication of the plurality of communications is a second response message, the instructions further directing the security interceptor to at least:

receive, at the security interceptor, a second message from a second source, wherein the second message from the second source comprises a first SFAI token appended to the second message;

determine, at the security interceptor, that a safety level of the first SFAI token appended to the second message indicates the second source is permitted;

in response to the safety level of the first SFAI token appended to the second message indicating the second source is permitted, send the second message to the generative AI platform;

wherein instructions to check the safety level of each source-specific SFAI token received with the plurality of communications direct the security interceptor to at least determine, at the security interceptor, that the safety level of the first SFAI token appended to the second response message indicates the second source is proscribed; and in response to the safety level of the first SFAI token appended to the second response message indicates the second source being proscribed, block the second response message from being sent to the second source.

17. The computer readable storage medium of claim 10, wherein at least one communication of the plurality of communications is a first request message to a second source, wherein instructions to check the safety level of each source-specific SFAI token direct the security interceptor to at least determine, at the security interceptor, that a safety level of a second SFAI token associated with the second source indicates the second source is permitted;

the instructions further directing the security interceptor to at least:

in response to the safety level of the second SFAI token indicating the second source is permitted, send the first request message to the second source;

receive, at the security interceptor, a first response message to the generative AI platform from the second source, wherein the first response message comprises the second SFAI token appended to the first response message;

determine, at the security interceptor, that a safety level of the second SFAI token appended to the first response message indicates the second source is permitted; and in response to the safety level of the second SFAI token appended to the first response message indicating the second source is permitted, send the first response message to the second source.

18. The computer readable storage medium of claim 17, wherein at least one communication of the plurality of communications is a second request message to the second source, wherein instructions to check the safety level of each source-specific SFAI token direct the security interceptor to at least determine, at the security interceptor, that the safety level of the second SFAI token that is appended to the second request message indicates the second source is proscribed; and in response to the safety level of the second SFAI token indicating the second source is proscribed, block the second request message from exiting the generative AI platform.

* * * * *